US009742009B2

(12) United States Patent
Motoi et al.

(10) Patent No.: US 9,742,009 B2
(45) Date of Patent: Aug. 22, 2017

(54) ALUMINUM FOIL FOR A CURRENT COLLECTOR AND METHOD OF MANUFACTURING THE SAME

(75) Inventors: Tetsuya Motoi, Aichi (JP); Yasushi Funato, Aichi (JP)

(73) Assignee: UACJ CORPORATION, Tokyo (JP)

( * ) Notice: Subject to any disclaimer, the term of this patent is extended or adjusted under 35 U.S.C. 154(b) by 82 days.

(21) Appl. No.: 14/381,423

(22) PCT Filed: Sep. 6, 2012

(86) PCT No.: PCT/JP2012/072734
§ 371 (c)(1),
(2), (4) Date: Aug. 27, 2014

(87) PCT Pub. No.: WO2013/128685
PCT Pub. Date: Sep. 6, 2013

(65) Prior Publication Data
US 2015/0099170 A1    Apr. 9, 2015

(30) Foreign Application Priority Data

Feb. 28, 2012    (JP) .................................. 2012-041494

(51) Int. Cl.
*H01M 4/70* (2006.01)
*H01M 4/66* (2006.01)
(Continued)

(52) U.S. Cl.
CPC .............. *H01M 4/70* (2013.01); *B21B 27/005* (2013.01); *B21B 27/10* (2013.01); *H01G 11/68* (2013.01);
(Continued)

(58) Field of Classification Search
CPC .............. B21B 1/227; B21B 2003/001; B21B 2261/14; B21B 27/005; B21B 27/10;
(Continued)

(56) References Cited

U.S. PATENT DOCUMENTS 3,855,136 A * 12/1974 McDole .............. B21B 45/0242
508/583
4,223,047 A * 9/1980 Pappert ..................... B05B 5/14
252/390
(Continued)

FOREIGN PATENT DOCUMENTS

| CN | 101512800 A | 8/2009 |
| JP | H11162470 A | 6/1999 |

(Continued)

OTHER PUBLICATIONS

Machine English translation of JP2010-150637.*
(Continued)

*Primary Examiner* — Nicholas P D'Aniello
*Assistant Examiner* — Ling R Zeng
(74) *Attorney, Agent, or Firm* — J-Tek Law PLLC; Jeffrey D. Tekanic; Scott T. Wakeman

(57) ABSTRACT

At least one foil surface of an aluminum foil is roughened; and in arithmetic mean roughnesses Ra, stipulated in JIS B 0601:2001, of the roughened surface(s), A, which is the arithmetic mean roughness Ra measured in a direction at a right angle to a rolling direction during foil rolling, and B, which is the arithmetic mean roughness Ra measured in a direction parallel to the rolling direction during foil rolling, satisfy the following relationships: 0.15 μm≤A≤2.0 μm; 0.15 μm≤B≤2.0 μm; and 0.5≤B/A≤1.5. Preferably 50-1000 μg/m² of oil is adhered to the roughened foil surface. The oil is preferably rolling oil.

19 Claims, 1 Drawing Sheet

ROLLING
DIRECTION

30 μm

(51) Int. Cl.
| | |
|---|---|
| *B21B 27/00* | (2006.01) |
| *B21B 27/10* | (2006.01) |
| *H01G 11/68* | (2013.01) |
| *H01M 4/131* | (2010.01) |
| *H01M 4/62* | (2006.01) |
| *B21B 1/22* | (2006.01) |
| *H01M 4/13* | (2010.01) |
| *B21B 3/00* | (2006.01) |

(52) U.S. Cl.
CPC .......... *H01M 4/131* (2013.01); *H01M 4/623* (2013.01); *H01M 4/625* (2013.01); *H01M 4/661* (2013.01); *B21B 1/227* (2013.01); *B21B 2003/001* (2013.01); *B21B 2261/14* (2013.01); *H01M 4/13* (2013.01); *Y02E 60/13* (2013.01); *Y10T 428/12431* (2015.01)

(58) Field of Classification Search
CPC ........ H01G 11/68; H01M 4/13; H01M 4/131; H01M 4/623; H01M 4/625; H01M 4/661; H01M 4/70; Y10T 428/12431; Y02E 60/13
See application file for complete search history.

(56) References Cited

U.S. PATENT DOCUMENTS

| | | | |
|---|---|---|---|
| 6,038,124 A | 3/2000 | Uchi et al. | |
| 6,195,251 B1 | 2/2001 | Suhara et al. | |
| 6,274,242 B1 | 8/2001 | Onodera et al. | |
| 2005/0112469 A1 | 5/2005 | Goto et al. | |
| 2005/0233066 A1 | 10/2005 | Sunagawa et al. | |
| 2010/0112452 A1* | 5/2010 | Nishimura | H01M 4/661 429/231.95 |
| 2010/0167111 A1 | 7/2010 | Sumihara et al. | |
| 2011/0277524 A1* | 11/2011 | Ichimoto | C10M 161/00 72/42 |

FOREIGN PATENT DOCUMENTS

| | | |
|---|---|---|
| JP | 2003051313 A | 2/2003 |
| JP | 2005002371 A | 1/2005 |
| JP | 2008159297 A | 7/2008 |
| JP | 2008258137 A | 10/2008 |
| JP | 2008270004 A | 11/2008 |
| JP | 2008282797 A | 11/2008 |
| JP | 2009231263 A | 10/2009 |
| JP | 2010150637 A * | 7/2010 |
| JP | 2011216336 A | 10/2011 |
| JP | 2013110049 A | 6/2013 |
| KR | 10-2009-0125788 | 12/2009 |
| TW | 353187 | 2/1999 |
| TW | 436510 | 5/2001 |
| TW | 201205931 A | 2/2012 |

OTHER PUBLICATIONS

English translation of International Preliminary Report on Patentability for parent PCT application No. PCT/JP2012/072734.
English translation of International Search Report for parent PCT application No. PCT/JP2012/072734.
Extended European Search Report from the European Patent Office dated Sep. 30, 2015 in related EP application No. 12869855.2, including European Search Opinion, European Search Report, and examined claims 1-6.
Office Action from the Chinese Patent Office dated Jan. 12, 2016 in counterpart Chinese application No. 201280070741.6, and translation thereof.
Office Action from the Korean Patent Office dated Feb. 19, 2016 in counterpart Korean application No. 10-2014-7026589, and machine translation thereof.
Office Action from the Taiwanese Patent Office dated Feb. 19, 2016 in counterpart Taiwanese application No. 101136498, and translation thereof.
Office Action mailed May 17, 2016 in counterpart JP application No. 2014-501954, including machine translation thereof.
Office Action from the Korean Patent Office mailed Oct. 25, 2016 in related Korean application No. 10-2014-7026589, and machine translation of substantive portions thereof.
English translation of Japanese Industrial Standard (JIS) B 0601:2013.

* cited by examiner

ALUMINUM FOIL FOR A CURRENT COLLECTOR AND METHOD OF MANUFACTURING THE SAME

CROSS-REFERENCE

This application is the US national stage of International Patent Application No. PCT/JP2012/072734 filed on Sep. 6, 2012, which claims priority to Japanese Patent Application No. 2012-041494 filed on Feb. 28, 2012.

TECHNICAL FIELD

The present invention relates to aluminum foil for a current collector and a method of manufacturing the same.

BACKGROUND ART

Aluminum foil is used as a current collector in secondary batteries, such as lithium-ion batteries, in electric double-layer capacitors, and the like. For example, in the case of a lithium-ion battery, the positive electrode is configured by fixing a positive electrode active material to an aluminum foil surface.

The above-mentioned positive electrode is manufactured, for example, as described below. That is, coating layers are formed by coating both surfaces of the aluminum foil, whose thickness is approximately 15 μm, with a paste that is prepared by dispersing a positive electrode active material powder such as lithium cobalt oxide, a binding agent such as polyvinylidene fluoride, an auxiliary conductive agent such as carbon black, and the like, in an organic solvent such as N-methylpyrrolidone, and then mixing such. Subsequently, by drying the coating layers, the organic solvent in the coating layers evaporates and is removed. After the above-mentioned drying, a press bonding process for increasing the intralayer density is performed as needed. In so doing, a positive electrode is manufactured wherein the surfaces of the aluminum foil serving as the current collector have a positive electrode active material-containing layer.

As discussed above, in the case wherein the electrode is configured by fixing the electrode active material to the current collector surfaces, it is critical that the current collector and the electrode active material-containing layers be in sufficiently close contact with one another. This is because, in the electrode manufacturing process, if the electrode active material-containing layers peel off of the current collector, then there is a risk that the yield will decrease; in addition, if that peeling occurs after incorporation in a secondary battery, an electric double-layer capacitor, or the like, then the characteristics, such as the lifespan, of the device will adversely degrade.

As a method that improves the adherence between the current collector and the electrode active material-containing layers, a method is known that roughens the surface of aluminum foil. For example, in Patent Document 1 an aluminum foil for a current collector is disclosed wherein a mean roughness Ra, which serves as the roughness of at least one surface and is based on JIS B 0601:1994, is greater than or equal to 0.3 μm and less than or equal to 1.5 μm, and a maximum height Ry is greater than or equal to 0.5 μm and less than or equal to 5.0 μm.

In addition, there are techniques that improve the adherence between the current collector and the electrode active material-containing layer by methods other than roughening. For example, in Patent Document 2 an aspect is disclosed wherein the coating ability of the paste is improved and the adherence of the electrode active material-containing layer is improved by sufficiently removing the rolling oil that adheres to the aluminum foil surface after foil rolling.

PRIOR ART LITERATURE

Patent Documents

Patent Document 1
Japanese Laid-open Patent Publication No. H11-162470
Patent Document 2
Japanese Laid-open Patent Publication No. 2008-159297

SUMMARY OF THE INVENTION

Nevertheless, the adherence of the electrode active material-containing layer to aluminum foil manufactured using conventional techniques is still insufficient, and presently there is demand for further improvement. Especially in the case wherein a powder form of the electrode active material is used, the adherence between the current collector and the electrode active material-containing layer tends to degrade.

The present invention considers such a problem, and an object of the present invention is to provide aluminum foil for a current collector, wherein an electrode active material-containing layer tends not to peel.

One aspect of the present invention is an aluminum foil for a current collector, wherein
  at least one foil surface is roughened; and
  in arithmetic mean roughnesses Ra, stipulated in JIS B 0601:2001, of the roughened surface(s), A, which is the arithmetic mean roughness Ra measured in a direction at a right angle to a rolling direction during foil rolling, and B, which is the arithmetic mean roughness Ra measured in a direction parallel to the rolling direction during foil rolling, satisfy the following relationships:
    $0.15\ \mu m \leq A \leq 2.0\ \mu m$;
    $0.15\ \mu m \leq B \leq 2.0\ \mu m$; and
    $0.5 \leq B/A \leq 1.5$.

In addition, another aspect of the present invention is a method of manufacturing an aluminum foil for a current collector, comprising:
  a foil forming process, wherein an aluminum plate is rolled to form an aluminum foil; and
  a roughening process, wherein (a) surface(s) of the aluminum foil formed by the foil forming process is (are) roughened;
wherein
  in the roughening process, at least one surface of the aluminum foil is roughened such that A, which is an arithmetic mean roughness Ra measured in a direction at a right angle to the rolling direction in the foil forming process, and B, which is the arithmetic mean roughness Ra measured in a direction parallel to the rolling direction in the foil forming process, satisfy the following relationships:
    $0.15\ \mu m \leq A \leq 2.0\ \mu m$;
    $0.15\ \mu m \leq B \leq 2.0\ \mu m$; and
    $0.5 \leq B/A \leq 1.5$.

Furthermore, the above-mentioned "aluminum" is a general term for a metal or an alloy that principally comprises aluminum, and conceptually includes pure aluminum and aluminum alloys.

Conventional aluminum foil is formed into a foil shape generally by rolling aluminum in one direction, and consequently a striped pattern is formed in the direction parallel to the rolling direction. Therefore, the arithmetic mean roughness Ra in the direction parallel to the rolling direction is extremely small relative to the arithmetic mean roughness Ra in the direction at a right angle to the rolling direction. Incidentally, it is common to measure the value of the arithmetic mean roughness Ra in the direction at a right angle to the rolling direction as an indicator of surface roughness in conventional aluminum foil, but the directionality of the surface roughness has not heretofore been taken into consideration.

In contrast, it was found for the first time in the present invention that adherence to the electrode active material-containing layer can be further improved by, taking surface roughness directionality into consideration, roughening the surface of the aluminum foil not only in a direction at a right angle to the rolling direction but also in a direction parallel to the rolling direction.

That is, the above-mentioned aluminum foil for a current collector is formed such that the values of the arithmetic mean roughnesses Ra in the direction at a right angle to and the direction parallel to the rolling direction, which are measured on the roughened foil surface of the aluminum foil, satisfy the above-mentioned specific relationships. Thereby, the roughened surface of the aluminum foil is a surface that has approximately the same arithmetic mean roughness Ra in both directions, namely, in the direction at a right angle to and the direction parallel to the rolling direction. As a result, the adherence of the electrode active material-containing layer can be further improved owing to the anchoring effect between the surface of the aluminum foil and the electrode active material-containing layer.

In addition, in the aluminum foil, the electrode active material-containing layer tends not to peel, even if the electrode active material is in powder form. Consequently, it is possible to provide an aluminum foil for a current collector wherein the electrode active material-containing layer tends not to peel. As a result, if, for example, the aluminum foil is used as the current collector of a secondary battery, an electric double-layer capacitor, or the like, then it is possible to reduce the incidence of peeling of the electrode active material containing layer from the collector in the electrode manufacturing process, and thereby to prevent a decrease in yield. In addition, because peeling-off after incorporation in a secondary battery, an electric double-layer capacitor, or the like can also be suppressed, it is possible to improve characteristics, such as the lifespan, of these devices.

DETAILED DESCRIPTION OF EMBODIMENTS

Figure 1:
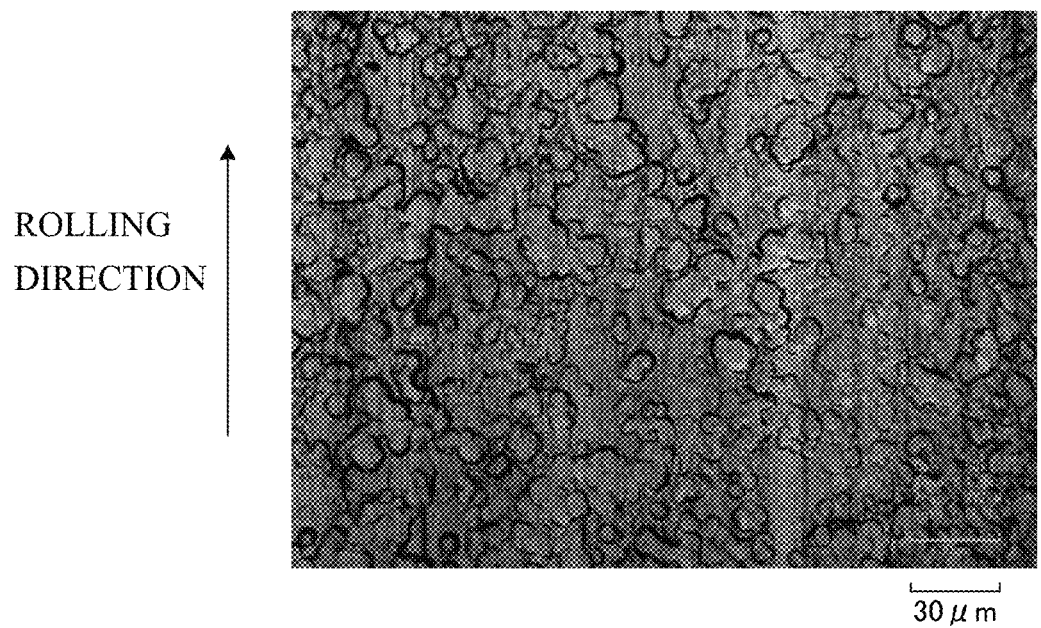
FIG. 1 is a photomicrograph of a sample 3 according to a working example 1.

In the above-mentioned aluminum foil for a current collector, one surface or both surfaces of the foil may be roughened. An arithmetic mean roughness Ra, which indicates the surface roughness of the roughened foil surface, is a value that is measured in conformance with JIS B 0601: 2001. Furthermore, if both surfaces are roughened, then the arithmetic mean roughness Ra of at least the foil surface on the side whereon the electrode active material-containing layer is formed should be within the above-mentioned specific ranges.

In the aluminum foil for a current collector, the lower limits of A and B, which are the arithmetic mean roughnesses Ra in a direction at a right angle to and a direction parallel to the rolling direction, respectively, are each 0.15 µm or greater. If the lower limits of A and B are each 0.15 µm or greater, then a sufficient anchoring effect can be obtained by roughening the surface, and thereby the adherence between the electrode active material-containing layer and the aluminum foil can be made satisfactory. If the lower limits of A and B are less than 0.15 µm, then the surface is no longer sufficiently roughened, a sufficient anchoring effect is not obtained, and the adherence of the electrode active material-containing layer degrades. Consequently, the lower limits of the A and B values are 0.15 µm or greater, and preferably 0.20 µm or greater.

On the other hand, the upper limit values of A and B are 2.0 µm or less. If the upper limit values of A and B are 2.0 µm or less, then the coating ability of the electrode active material-containing layer is satisfactory. Consequently, using the above-mentioned aluminum foil as the current collector makes it possible to manufacture electrodes with good yields. If the upper limit values of A and B exceed 2.0 µm, then the height difference between the recessed parts and the protruding parts in the roughened surface becomes excessively large, and consequently there is a risk that the continuous coating ability of the electrode active material-containing layer will degrade, that the foil will break, that cracks will be created during the formation of the coating or during press bonding after the coating, and the like. In addition, there is a risk that it will become difficult for the electrode active material-containing layer to fill-in as far as the bottoms of the recessed parts in the surface, thereby degrading electrical conductivity. Consequently, the upper limit values of A and B are set to 2.0 µm or less, and preferably to 1.5 µm or less.

In addition, the value of B/A, which is the ratio of the B value to the A value, is greater than or equal to 0.5 and less than or equal to 1.5. If the value of B/A is within the above-mentioned specific range, then the difference between the arithmetic mean roughness Ra in the direction perpendicular to the rolling direction and the arithmetic mean roughness Ra in the direction parallel to the rolling direction is comparatively small. Thereby, an isotropic roughened surface can be obtained, which makes it possible to obtain a sufficient anchoring effect. As a result, the adherence between the electrode active material-containing layer and the aluminum foil can be made satisfactory.

If the lower limit of B/A is less than 0.5, then the arithmetic mean roughness Ra in the direction parallel to the rolling direction becomes excessively small relative to the arithmetic mean roughness Ra in the direction perpendicular to the rolling direction, the anchoring effect produced by the recesses and protrusions is consequently insufficient, and thereby the adherence of the electrode active material-containing layer degrades. In addition, if the upper limit value of B/A exceeds 1.5, then the arithmetic mean roughness Ra in the direction parallel to the rolling direction becomes excessively large relative to the arithmetic mean roughness Ra in the direction perpendicular to the rolling direction, the anchoring effect produced by the recesses and protrusions is consequently insufficient, and thereby the adherence of the electrode active material-containing layer degrades. Consequently, the value of B/A is set to greater than or equal to 0.5 and less than or equal to 1.5, and preferably to greater than or equal to 0.8 and less than or equal to 1.3.

In addition, oil may be adhered to the roughened foil surface at 50-1000 µg/m$^2$.

If oil is adhered to the aluminum foil in the above-mentioned specific amount, then the adherence between the electrode active material-containing layer and the aluminum foil can be further improved.

If the amount of the oil adhered is less than 50 $\mu g/m^2$, then the adherence between the electrode active material-containing layer and the current collector will degrade, thereby making it difficult to obtain sufficient peel strength. It is conjectured that the principal cause of this is the decrease in the affinity to the paste when the electrode active material-containing layer is being formed. Consequently, the amount of the oil adhered is preferably 50 $\mu g/m^2$ or greater, more preferably 100 $\mu g/m^2$ or greater, and yet more preferably 150 $\mu g/m^2$ or greater.

On the other hand, if the amount of the oil adhered exceeds 1000 $\mu g/m^2$, then excess oil will remain between the electrode active material-containing layer and the current collector after the paste is applied to the foil surface and dried. Thereby, the adherence between the electrode active material-containing layer and the current collector will degrade, making it difficult to obtain sufficient peel strength. Consequently, the amount of the oil adhered is preferably 1000 $\mu g/m^2$ or less, more preferably 900 $\mu g/m^2$ or less, and yet more preferably 800 $\mu g/m^2$ or less.

Furthermore, the amount ($\mu g/m^2$) of the oil can be derived by dividing the total amount ($\mu g$) of the oil adhering to the front and rear surfaces of the aluminum foil by the total surface area ($m^2$) of the front and rear surfaces of the aluminum foil. The amount of the oil can be measured by, for example, cleaning the aluminum foil using an organic solvent, an acid, or the like that is capable of dissolving the oil, and then using gas chromatography to analyze that cleaning liquid.

In addition, the oil may be a rolling oil.

In such a case, after the aluminum foil is roughened, a state results wherein rolling oil is already adhered to the surface(s) of the aluminum foil. Namely, there is no longer a need to separately adhere the oil to the surface(s) of the aluminum foil prior to applying the electrode active material. Consequently, the aluminum foil manufacturing process can be simplified and productivity can be improved. Furthermore, in the present case, if the above-mentioned specific amount of the oil is adhered, then the electrode active material can be applied to the roughened aluminum foil as is. If the adhered amount of the oil is not within the above-mentioned specific range, then, for example, it is also possible to adjust the adhered amount of the oil so that it is within the above-mentioned specific range by methods such as supplying additional oil after the roughening, cleaning the foil surfaces using a cleaning agent such as an alkali or an organic solvent, or the like. As a method of supplying additional oil, it is possible to use, for example, a bar coating method, a roll coating method, an electrostatic oiling method, or the like.

The rolling oil contains mineral oil, which serves as a base oil, and an oiliness agent that comprises one or two or more constituents selected from the group consisting of: a monohydric or polyhydric higher alcohol; a fatty acid; a fatty acid ester; and an amine; furthermore, in total, the oiliness agent preferably is 0.1-5 mass % of the entire rolling oil. In such a case, the lubricity during foil rolling is excellent and the generation of rolling abrasion particles can be reduced. Consequently, it is possible to reduce post-rolling defects, such as pits and pinholes, and thereby to improve the surface quality of the aluminum foil.

In addition, the content of the oiliness agent is preferably 0.3 mass % or greater, more preferably 0.5 mass % or greater, and yet more preferably 1.0 mass % or greater. In such a case, the lubricity during foil rolling is excellent. Consequently, it is possible to effectively reduce the generation of wrinkles caused by insufficient lubrication during foil rolling, the occurrence of contamination on the foil surfaces due to abrasion particles, and the like, thereby making it easy to manufacture aluminum foil with excellent surface quality. Moreover, the content of the oiliness agent is preferably 4.5 mass % or less, more preferably 4 mass % or less, and yet more preferably 3 mass % or less. This can also contribute to the effect of improving the surface quality of the foil, the uniform solubility in the base oil, the excellent cold workability, and a reduction in cost. Thus, reducing the amounts of the rolling oil and the oiliness agent to within the above-mentioned specific range makes it possible to manufacture the aluminum foil for the current collector using aluminum foil having excellent surface quality. As a result, it is yet more advantageous in improving the peel strength of the electrode active material-containing layer.

Mineral oil, such as a naphthene or a paraffin, can be used as the base oil that constitutes the rolling oil. For example, as the monohydric or polyhydric higher alcohol, examples that can be cited include monohydric or polyhydric alkyl alcohol with 9-19 carbon atoms. For example, as the fatty acid, examples that can be cited include saturated or unsaturated fatty acids with 9-19 carbon atoms. For example, as the fatty acid ester, examples that can be cited include saturated or unsaturated fatty acid esters with 9-19 carbon atoms. For example, as the amine, examples that can be cited include aromatic amines such as phenyl-α-naphthylamine. One of these can be used or two or more of these can be used in combination. In particular, lauryl alcohol can be selected as the higher alcohol, oleic acid can be selected as the fatty acid, oleic acid ester can be selected as the fatty acid ester, and phenyl-α-naphthylamine can be selected as the amine. The effects described above are easy to obtain in such a case, which is yet more advantageous in improving the peel strength of that electrode active material-containing layer with respect to the aluminum foil.

In addition, the alkylene oxide addition product of a partial fatty acid ester of polyhydric alcohol or the like can be added to the rolling oil. In such a case, the lubricity during foil rolling is excellent and the generation of rolling abrasion particles is reduced, which is advantageous in improving the surface quality of the foil. In addition, one or two or more of various additives, such as an antioxidant, a viscosity-increasing agent, a rust preventive agent, a corrosion inhibitor, a defoaming agent, an emulsifying agent, an antistatic agent, or the like can also be added to the rolling oil as needed.

The thickness of the aluminum foil for the current collector is preferably 10-100 μm. If the thickness is 10 μm or greater, then breaks, cracks, and the like tend not to occur in the foil when the foil surface is roughened, which tends to contribute to improvement in the peel strength. In addition, if the thickness is 100 μm or less, then the volume, the weight, and the like of the foil are proper for a current collector, which tends to contribute to reducing the size and weight of the secondary battery, the electric double-layer capacitor, or the like, which incorporates the current collector, and is also advantageous from the standpoint of reducing cost. Consequently, the thickness of the current collector aluminum foil is preferably 10-100 μm, more preferably 10-50 μm, and yet more preferably 10-30 μm.

The composition of the aluminum foil for the current collector is not particularly limited, as long as foil rolling is possible. For example, as the composition of the aluminum foil for the current collector, examples that can be cited include JIS 1085, 1070, 1050, 1N30, 1100, 3003, 3004, 8021, 8079 and the like.

The aluminum foil for the current collector is preferably a hard material (an H material). In such a case, annealing is not performed after the aluminum foil is roughened, and therefore the residual rolling oil can be used as the oil.

The current collector aluminum foil can be used, for example, as the current collector of an electrode of a secondary battery, such as a lithium-ion battery, a lithium polymer battery, or the like, and as the current collector of an electrode of an electric double-layer capacitor or the like.

In addition, when the current collector aluminum foil is used as a current collector, the electrode active material-containing layer is formed on the roughened foil surface. The electrode active material-containing layer is preferably formed by a process of applying a paste that includes at least an electrode active material, a binding agent, and an organic solvent. In addition, the aluminum foil can exhibit excellent adherence even if the electrode active material is in powder form, which makes it possible to suitably use a material in powder form as the electrode active material.

In addition, one illustrative example of the organic solvent is N-methylpyrrolidone. N-methylpyrrolidone is ideally suited to use as the organic solvent from the viewpoints of ease of procurement, handleability, cost, and the like.

Furthermore, the paste may additionally include a conductive agent and the like. In addition, after the paste is applied, it is also possible, after the formation of the coating layer, to further add, as needed, processes such as a drying process, a heat treatment process, a press bonding process, or the like.

Next, a method of manufacturing the aluminum foil for a current collector will be explained. A method that comprises the foil forming process and the roughening process as described above can be adopted as the current collector aluminum foil manufacturing method. Furthermore, at least one surface of the aluminum foil is roughened by the roughening process such that A, which is the arithmetic mean roughness Ra measured in the direction at a right angle to the rolling direction in the foil forming process, and B, which is the arithmetic mean roughness Ra measured in the direction parallel to the rolling direction in the foil forming process, satisfy the specific relationship described above.

In the foil forming process, an aluminum plate, whose thickness is greater than that of the aluminum foil to be obtained, is prepared, and it is subjected to at least cold rolling. Well-known methods can be adopted as the cold rolling method.

In the roughening process, it is preferable to roughen the surface(s) of the aluminum foil by passing the aluminum foil between a pair of roughening rolls, at least one roll surface of which has been roughened, thereby transferring the contour(s) of the roll surface(s) to the surface(s) of the aluminum foil.

Adopting the method described above in the roughening process makes it easy to manage the degree, shape, and the like of the roughening. Namely, because a technique known as transferring is used, it is possible to make the degree and shape of the roughening uniform over the entire length of the aluminum foil merely by modifying the contour of the roll surface. As a result, it becomes easy to stabilize the quality of the aluminum foil.

In addition, if the technique known as transferring is used as described above, then the foil forming process and the roughening process may be performed separately or consecutively. If the foil forming process and the roughening process are performed consecutively, then it is possible to adopt, for example, a method that incorporates the roughening roll equipment for the above-mentioned transfer in a rolling mill. In such a case, the aluminum foil manufacturing method can be simplified and productivity can be improved.

As methods of roughening the roll surface of the roughening roll, examples that can be cited include sandblasting, liquid honing, shot peening, electrical discharge machining, laser texturing, fine powder spraying, and the like. Furthermore, the roughened roll surface may be subject to a chrome-plating process. One of these can be performed, or two or more can be performed in combination.

Furthermore, in the roughening process, for example, the following various mechanical methods, chemical methods, and physical methods can be adopted as methods other than the methods described above. As mechanical methods, examples that can be cited include: a method of rubbing the foil surface with an abrasive paper such as emery paper; a method of roughening the foil surface using a blasting process such as sandblasting; and the like. In addition, as chemical methods, examples that can be cited include: a method of etching with, for example, an acid; and the like. Furthermore, because an oxide film (alumite) tends to form on the surface of aluminum, it is preferable to suitably select the etchant, the etching conditions, and the like. In addition, as physical methods, examples that can be cited include: a method of roughening the surface by bombarding the surface with ions, such as in sputtering; and the like. One of these methods may be used, or two or more of these methods may be used in combination.

In addition, in the roughening process wherein the foil forming process and the roughening process are performed consecutively, the rolling oil that adheres to the aluminum foil after the foil forming process is used as the lubricating oil in the roughening process, and therefore lubricating oil does not have to be newly supplied.

In this case, the residual rolling oil, which is the rolling oil that is used in the foil forming process and the residual portion thereof, can be used as the lubricating oil in the roughening process. Consequently, the aluminum foil manufacturing process can be simplified and productivity can be improved.

WORKING EXAMPLES

Working examples of the current collector aluminum foil are explained below.

Working Example 1

<Foil Forming Process>

An aluminum plate made of a JIS1085 material was prepared, the aluminum plate was cold rolled, and thereby aluminum foils, each with a thickness of 20 $\mu$m and made of a JIS1085-H18 material, were obtained. During the cold rolling, a rolling oil containing an oiliness agent (containing lauryl alcohol, oleic acid, and an oleic acid ester) included in a naphthenic oil was used as the lubricating oil.

<Roughening Process>

The roughening rolls were manufactured by shot blasting both roll surfaces of a pair of roughening rolls, subsequently chrome-plating the roll surfaces, and then adjusting the surface roughnesses of the roll surfaces to various values. The aluminum foils were passed between the roughening rolls, and thereby the contours of the roll surfaces were transferred to the surfaces of the aluminum foils. Thereby, aluminum foils (i.e., sample 1 through sample 7), each having one roughened surface, were obtained having the various arithmetic mean roughnesses Ra listed in Table 1.

The measurement of the arithmetic mean roughnesses Ra, the measurement of the amount of the residual rolling oil, and the evaluation of the adherence to the electrode active material-containing layer were performed by the methods below for each sample obtained by the method described above.

<Measurement of Arithmetic Mean Roughness Ra>

The arithmetic mean roughnesses Ra of the aluminum foils were measured using a method that conforms to JIS B 0601:2001. Namely, a confocal laser scanning microscope (manufacturer: Olympus Corporation; product name: OLYMPUS-OLS3000) was used to measure the arithmetic mean roughness Ra at six locations in each of the direction at a right angle to and the direction parallel to the rolling direction in the foil forming process, and the average values thereof are shown in Table 1.

<Measurement of Amount of Residual Rolling Oil>

From each of the samples described above, a test piece was obtained such that the total surface area of the front and rear surfaces of the test piece was 800 cm$^2$. The obtained test piece was cut into strips, which were all placed in a 250 ml measuring flask. 70 ml of hexane was added to the measuring flask, the measuring flask was agitated and heated for 20 min on a 70° C. hotplate. Thereafter, the measuring flask was well agitated and the solution in the measuring flask was collected as extract A.

After extract A was extracted, 90 ml of distilled water, 30 ml of hexane, and 30 ml of 6N hydrochloric acid were subsequently added to all the strip samples, and this was left alone until the aluminum decomposition reaction subsided. Thereafter, 10 ml of 6N hydrochloric acid was further added, this was left alone until the surfaces of the strip samples completely decomposed, and the measuring flask was agitated; thereby, the residual oil was extracted in the hexane. Subsequently, the hexane extract separated from the surface layer was transferred into a 100 ml beaker using a glass pipette. Next, this extract was heated and evaporated until it became approximately 20 ml, after which it was further evaporated at room temperature until it became approximately 5 ml. Subsequently, the extract was vacuum concentrated using a vacuum desiccator, and the solution wherein the hexane had been completely evaporated was collected as extract B.

Subsequently, extract A and extract B were dissolved in 100 µl of hexane, and 4 µl of such was injected into a gas chromatograph and analyzed. The total amount of the residual rolling oil included in the 100 µl of the hexane was calculated based on the concentration of the residual rolling oil obtained by the gas chromatographic analysis. Furthermore, Table 1 shows the amount of residual rolling oil per unit of area (µg/m$^2$) calculated by dividing the total amount of the residual rolling oil by the total surface area.

Furthermore, the gas chromatographic analysis was performed as below.

Analytical equipment: made by Shimadzu Corporation, GC-14B
Column: G column, G-205 40 m
Detector: FID
Detector temperature: 320° C.
Carrier gas: nitrogen gas, 30 ml/min <Evaluation of Adherence of Current Collector Aluminum Foil>

The adherence of the current collector aluminum foil was evaluated by measuring the 180° peel strength between the current collector aluminum foil and the electrode active material-containing layer in conformance with JIS K 6854-2:1999. Furthermore, here, it was assumed that the prepared current collector aluminum foil would be utilized as the current collector of a lithium-ion battery.

Specifically, a paste was prepared by mixing 60 parts by mass of a general purpose $LiCoO_2$ powder, which served as the positive electrode active material, 5 parts by mass of acetylene black, which served as the auxiliary conductive agent, 5 parts by mass of polyvinylidene fluoride, which served as the binding agent, and 30 parts by mass of N-methylpyrrolidone, which served as the organic solvent. A roll coater was used to coat one side (the roughened surface) of each test piece with the prepared paste to a thickness of 20 µm, and it was dried under the conditions of 90° C. for 5 min. Thereby, samples were prepared wherein a positive electrode active material-containing layer was formed on the roughened surface of each aluminum foil.

Subsequently, the 180° peel strength of each of the obtained samples was measured in conformance with JIS K 6854-2:1999 "Part 2: 180° Peel." At this time, a hard vinyl chloride plate having a thickness of 3 mm was used as the rigid adhered material in the standard. In addition, two-sided tape (made by Nichiban Co., Ltd., "NW-25"), which served as an adhesive for bonding the surface of the positive electrode active material-containing layer of each sample to the surface of the aluminum plate material, was used. In addition, in the above-mentioned standard, the rate at which the sample was pulled by the grip was 100 mm/min. Furthermore, the peel strength (N/25 mm) of each sample was measured five times, and the peel strength of each sample listed in Table 1 is the average value of the five measurement values obtained. A peel strength of 2.0 N/25 mm or greater was considered a passing grade.

Table 1 shows the configuration and the evaluation results of each of the current collector aluminum foils that were prepared.

TABLE 1

| Sample No. | Arithmetic Surface Roughness Ra | | | Amount of Residual Rolling Oil (µg/m$^2$) | 180° Peel Strength (N/25 mm) |
| | A (µm) | B (µm) | B/A | | |
| --- | --- | --- | --- | --- | --- |
| Sample 1 | 0.22 | 0.19 | 0.86 | 78 | 2.52 |
| Sample 2 | 0.48 | 0.28 | 0.58 | 359 | 2.76 |
| Sample 3 | 0.55 | 0.54 | 0.98 | 894 | 2.79 |
| Sample 4 | 0.65 | 0.95 | 1.46 | 573 | 2.99 |
| Sample 5 | 1.74 | 1.62 | 0.93 | 166 | 2.54 |
| Sample 6 | 0.24 | 0.06 | 0.25 | 533 | 1.93 |
| Sample 7 | 0.30 | 0.11 | 0.37 | 177 | 1.98 |

As can be understood from Table 1, for every sample whose A and B values, which are the arithmetic mean roughnesses Ra in the direction at a right angle to and the direction parallel to the rolling direction, respectively, are within the above-mentioned specific range, the aluminum foil and the positive electrode active material-containing layer are sufficiently adhered. Consequently, it was confirmed that peeling of the positive electrode active material-containing layer tends not to occur.

Thus, FIG. 1 shows a micrograph of sample 3 as a representative example of aluminum foil that exhibits sufficient adherence to the positive electrode active material-containing layer. As can be understood from FIG. 1, in the aluminum foil whose A and B values are within the above-mentioned specific range, the contours of the roll surfaces were transferred, and the aluminum foil was isotropically roughened. Furthermore, FIG. 1 includes a scale that indicates a length of 30 μm.

If such a current collector aluminum foil is used, for example, as the current collector of a lithium-ion battery, then it becomes easy to reduce peeling of the positive electrode active material-containing layer owing to changes in the volume of the positive electrode active material that arise from the doping and de-doping of lithium in the charging-discharging cycle of the battery and to reduce peeling in the electrode manufacturing process, thereby making it possible to contribute to improving the cycle characteristics of the battery.

In contrast, in samples whose A and B values are less than the lower limits of the above-mentioned specific ranges, the peel strength of the positive electrode active material-containing layer was insufficient, resulting in a deterioration in the adherence to the aluminum foil. This is thought to be caused by the inability to obtain a sufficient anchoring effect by surface unevenness.

Figure 2:
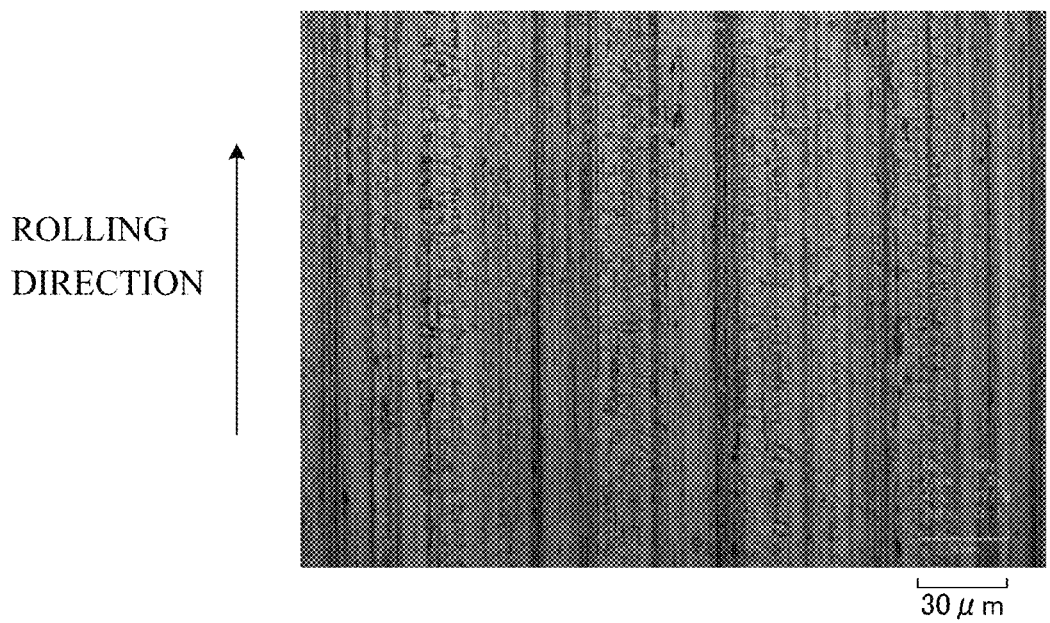
FIG. 2 is a photomicrograph of a sample 6 according to the working example 1.

FIG. 2 shows a micrograph of sample 6 as a representative example of an aluminum foil for which the adherence to the positive electrode active material-containing layer is insufficient. As can be understood from FIG. 2, in the aluminum foils whose A and B values are outside of the above-mentioned specific ranges, a striped pattern formed in the direction parallel to the rolling direction was observed. Furthermore, FIG. 2 includes a scale that indicates a length of 30 μm.

In addition, although not mentioned in Table 1, in foils whose A and B values exceeded the upper limit values of the above-mentioned specific ranges, the foil broke and cracks occurred during the coating formation of the positive electrode active material-containing layer, and therefore the positive electrode active material-containing layer could not be applied. Furthermore, even if the foil had not broken and the positive electrode active material-containing layer could have been applied, it would have been difficult for the positive electrode active material-containing layer to contact the bottoms of the recessed parts of the surface unevenness, and therefore it is surmised that the electrical conductivity would have degraded if the positive electrode active material-containing layer had been applied as the positive electrode of a lithium-ion battery.

Working Example 2

The present example investigated the amount of residual rolling oil that adheres to the surface of the roughened aluminum foil. In the present example, aluminum foils wherein one surface was roughened were prepared using the same procedure as was used for sample 3 in Working Example 1. Thereafter, the aluminum foils were subject to alkali cleanings of various strengths and weaknesses, and samples (sample 11 through sample 12) were prepared by adjusting the amounts of the residual rolling oil adhering to the roughened foil surface to the values indicated in Table 2. Furthermore, all else was the same as in Working Example 1.

Table 2 shows the configurations and the evaluation results of each of the current collector aluminum foils that were prepared.

TABLE 2

| Sample No. | Arithmetic Surface Roughness Ra | | | Amount of Residual Rolling Oil (μg/m$^2$) | 180° Peel Strength (N/25 mm) |
|---|---|---|---|---|---|
| | A (μm) | B (μm) | B/A | | |
| Sample 11 | 0.55 | 0.54 | 0.98 | 894 | 2.79 |
| Sample 12 | 0.55 | 0.54 | 0.98 | 38 | 2.27 |

As can be understood from Table 2, for each prepared sample, the A and B values are within the above-mentioned specific ranges, and the aluminum foil and the positive electrode active material-containing layer are sufficiently adhered. However, with regard to the sample containing the residual rolling oil in the amount of less than the lower limit of the above-mentioned specific range, it was confirmed that the adherence deteriorated somewhat compared to that of the sample containing the residual rolling oil in the amount within the above-mentioned specific range although it is at a level that peeling of the positive electrode active material-containing layer hardly occurs.

The text above explains working examples, but the present invention is not limited to these working examples, and it is understood that various modifications may be effected without departing from the object of the invention.

For example, in the above-mentioned working examples, the positive electrode active material-containing layer was formed on a current collector aluminum foil that was prepared using a material suited to be the positive electrode of a lithium-ion battery, but it is also possible to form the electrode active material-containing layer on a current collector aluminum foil that is prepared using a material suited to be an electrode of an electric double-layer capacitor; in such a case as well, the same peel strength improvement effect as described above can be obtained.

The invention claimed is:

1. A method of manufacturing an aluminum foil for a current collector, comprising:
   rolling an aluminum plate with rolling oil to form an aluminum foil having 150-1000 μg/m$^2$ of the rolling oil adhered thereto; and
   subsequently, roughening at least one surface of the aluminum foil by passing the aluminum foil between a pair of rolls using the adhered rolling oil as a lubricating oil without providing additional lubricating oil, at least one roll surface of the pair of rolls having a rough contour, and transferring the rough contour to the at least one surface of the aluminum foil such that the roughened aluminum foil satisfies the following relationships:
   0.15 μm≤A≤2.0 μm;
   0.15 μm≤B≤2.0 μm; and
   0.5≤B/A≤1.5,
   wherein:
   A is an arithmetic mean roughness Ra measured in a direction at a right angle to a rolling direction during foil rolling, and
   B is the arithmetic mean roughness Ra measured in a direction parallel to the rolling direction during foil rolling.

2. The method according to claim 1, wherein roughening the at least one surface of the aluminum foil comprises roughening the at least one surface such that an isotropic roughened surface results.

3. The method according to claim 1, wherein roughening the at least one surface of the aluminum foil comprises roughening the at least one surface such that A and B are 0.20 µm or greater and are 1.5 µm or less.

4. The method according to claim 1, wherein roughening the at least one surface of the aluminum foil comprises roughening the at least one surface such that $0.8 \leq B/A \leq 1.3$.

5. The method according to claim 1, wherein the roughening is performed such that 150-900 µg/m² of oil is adhered to the roughened foil surface after the roughening has been completed.

6. The method according to claim 1, wherein the roughening is performed such that 359-1000 µg/m² of oil is adhered to the roughened foil surface after the roughening has been completed.

7. The method according to claim 1, wherein the roughening is performed such that 359-900 µg/m² of oil is adhered to the roughened foil surface after the roughening has been completed.

8. The method according to claim 1, wherein the roughening is performed such that 166-900 µg/m² of oil is adhered to the roughened foil surface after the roughening has been completed.

9. The method according to claim 1, further including applying a paste to the roughened aluminum foil, the paste including at least an electrode active material, a binding agent and an organic solvent.

10. The method according to claim 9, further including press bonding the aluminum foil after applying the paste.

11. The method according to claim 1, wherein rolling the aluminum plate comprises cold rolling the aluminum plate.

12. A method of manufacturing an aluminum foil for a current collector, comprising:
    cold rolling an aluminum plate with rolling oil to form an aluminum foil having 150-1000 µg/m² of the rolling oil adhered thereto, the aluminum foil having a first surface roughness; and
    subsequently, changing the first surface roughness by passing the aluminum foil between a pair of rolls, at least one of the rolls having a roughened surface formed by shot peening, without adding any additional rolling oil after the cold rolling of the aluminum foil, such that a contour of the roughened surface is transferred to at least one surface of the aluminum foil and such that the at least one surface of the aluminum foil, which has been roughened, satisfies the following relationships after the aluminum foil has been passed through the pair of rolls:
    $0.15 \ \mu m \leq A \leq 2.0 \ \mu m$;
    $0.15 \ \mu m \leq B \leq 2.0 \ \mu m$; and
    $0.5 \leq B/A \leq 1.5$,
    wherein:
    A is an arithmetic mean roughness Ra measured in a direction at a right angle to a rolling direction during foil rolling,
    B is the arithmetic mean roughness Ra measured in a direction parallel to the rolling direction during foil rolling; and
    the roughness of the at least one roughened surface of the aluminum foil is isotropic.

13. The method according to claim 12, wherein:
    the roughened aluminum foil has a length in the rolling direction during foil rolling and a width perpendicular to the length; and
    the contour of the roughened surface of the at least one of the rolls having a roughened surface is constituted such that:
    the arithmetic mean roughness Ra across the entire length of the resulting roughened aluminum foil is between 0.15-2.0 µm at every width location of the roughened aluminum foil; and
    the arithmetic mean roughness Ra across the entire width of the resulting roughened aluminum foil is between 0.15-2.0 µm at every length location of the roughened aluminum foil.

14. The method according to claim 12, wherein changing the first surface roughness comprises roughening the at least one surface such that A and B are each 0.20 µm or greater and are each 1.5 µm or less.

15. The method according to claim 12, wherein changing the first surface roughness comprises roughening the at least one surface such that $0.8 \leq B/A \leq 1.3$.

16. The method according to claim 12, wherein 150-900 µg/m² of oil is adhered to the roughened foil surface after the roughening has been completed.

17. The method according to claim 12, wherein 359-1000 µg/m² of oil is adhered to the roughened foil surface after the roughening has been completed.

18. The method according to claim 12, wherein 359-900 µg/m² of oil is adhered to the roughened foil surface after the roughening has been completed.

19. The method according to claim 12, wherein 166-900 µg/m² of oil is adhered to the roughened foil surface after the roughening has been completed.

* * * * *